United States Patent [19]
Tokutomi et al.

[11] 3,823,410
[45] July 9, 1974

[54] CAMERA SHUTTER CONTROLS UTILIZING LIGHT FROM DIFFERENT SOURCES

[75] Inventors: Seijiro Tokutomi, Fujisawa; Masahiro Kawasaki, Tokyo, both of Japan

[73] Assignee: Asahi Kogaku Kogyo Kabushiki Kaisha, Tokyo-to, Japan

[22] Filed: Feb. 20, 1973

[21] Appl. No.: 333,750

[30] Foreign Application Priority Data
Feb. 23, 1972  Japan.............................. 47-19137

[52] U.S. Cl..................................... 354/33, 354/35
[51] Int. Cl............................................ G03b 15/05
[58] Field of Search............ 95/10 CE, 11 L, 11.5 R

[56] References Cited
UNITED STATES PATENTS
3,680,457  8/1972  Uno et al.......................... 95/10 CE
3,709,123  1/1973  Tukutomi........................ 95/10 CE Primary Examiner—Samuel S. Matthews
Assistant Examiner—Russell E. Adams, Jr.
Attorney, Agent, or Firm—Steinberg & Blake

[57]  ABSTRACT

A camera which has an objective and a photosensitive device capable of receiving light which has travelled through the objective. This photosensitive device receives light created during preparatory flash illumination and forms part of a preparatory circuit for creating an electrical quantity which achieves a peak value during the preparatory flash illumination. A memory device such as a capacitor retains this peak value and is then used together with a control circuit to terminate flash illumination during a subsequent main flash which provides illumination during film exposure. Thus, the duration of the main flash is determined in accordance with the peak value retained by the memory device.

10 Claims, 14 Drawing Figures

3,823,410

CAMERA SHUTTER CONTROLS UTILIZING LIGHT FROM DIFFERENT SOURCES

BACKGROUND OF THE INVENTION

The present invention relates to cameras.

In particular, the present invention relates to cameras which have photosensitive devices capable of responding to light which has already travelled through the objective of the camera.

While such photosensitive devices are highly desirable because of the automatic compensation for the characteristics of the objective, nevertheless there are certain disadvantages inherent in the use of such devices, particularly in connection with exposures made with flash illumination.

In order to achieve automatic exposure controls with cameras of the above type during flash illumination, it is known to provide a preparatory flash from which information is derived to control the duration of a main flash which is used during film exposure. When the light during the preparatory flash illumination is detected with a photosensitive device which receives this light after it has travelled through the objective of the camera, the light which is received by the photosensitive device is limited because of the fact that the light first travels through the objective, and as a result there is a decrease in the photocurrent of the light receiving element. Thus, the load resistance resulting from the use of such an internal light-receiving element increases and as a consequence the light response speed decreases. While it is possible to reduce the load resistance of the photosensitive light-receiving element in order to achieve a more rapid response, the result of using this latter expedient is that the output voltage is necessarily decreased and it then becomes necessary to utilize complex amplifying circuits which are highly undesirable.

SUMMARY OF THE INVENTION

It is accordingly a primary object of the present invention to provide a camera with a structure and circuitry which will avoid the above drawbacks.

In particular, it is an object of the present invention to provide a camera which is capable of utilizing an internal photosensitive element for receiving light from the flash illumination, even though the response of such an element is necessarily slow.

A further object of the present invention is to provide a camera capable of operating with such a photosensitive element of slow response without requiring the use of any complex amplifying circuits.

Thus, it is an object of the present invention to provide a camera which is capable of utilizing internal light measurement, which is to say measurement of light which has travelled through the objective, even in connection with flash illumination, without the drawbacks normally encountered under these conditions as pointed out above.

A further object of the present invention is to provide a camera of the above type which utilizes relatively simple circuitry for achieving automatic control of flash illumination in a highly effective and highly precise manner.

According to the invention a flash means is provided for producing preparatory flash illumination prior to film exposure and main flash illumination during film exposure. A photosensitive means is provided for detecting light during the preparatory flash illumination, this photosensitive means receiving this light after it has passed through the objective of the camera. A preparatory circuit means is electrically connected with this photosensitive means for participating therewith in the creation of an electrical quantity which achieves a peak value during the period of preparatory flash illumination. A memory means is electrically connected with the preparatory circuit means for retaining this peak value. A flash-terminating means is electrically connected with the flash means for terminating the operation of the latter after the main flash illumination has started, and a control circuit means is connected between the memory means and the flash-terminating means to actuate the latter to terminate the main flash illumination at an instant determined in accordance with the peak value retained by the memory means.

BRIEF DESCRIPTION OF DRAWINGS

The invention is illustrated by way of example in the accompanying drawings which form part of this application and in which.

DESCRIPTION OF PREFERRED EMBODIMENTS

Figure 5:
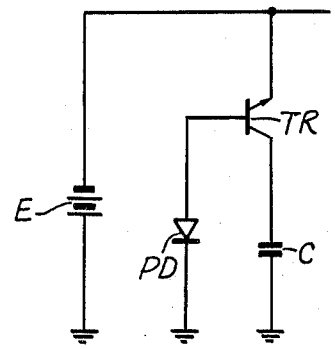
FIG. 5 is a schematic illustration of a prior art circuitry to demonstrate the disadvantages thereof.

Referring first to FIG. 5, the circuitry thereof illustrates a conventional arrangement. Thus, while it is known to use circuitry as illustrated in FIG. 5 for receiving light externally of the objective, which is to say light which has not travelled through the objective of the camera, if such a circuit is used to receive light after the light has travelled through the objective, then due to the decrease in the photocurrent of the light receiving element PD, the load resistance increases and the light response speed decreases. As may be seen from FIG. 5, a transistor TR controls the current flowing to a timing capacitor C, and this transistor TR is in turn controlled by the light receiving element PD, these components being located in the fragmentarily illustrated circuit of FIG. 5 which is supplied with energy from the source E. The output of the light receiving element PD which receives only a limited amount of light due to internal light reception resulting from transmitting light to the element PD only after the light travels through the camera objective, creates a relationship according to which the internal resistance of transistor TR is too great as compared to the output of element PD, so that the speed of response to instantaneous light is decreased. As a result of these conditions it is difficult to achieve proper controls for flash illumination.

As was pointed out above, while it is possible to provide amplifying circuits to alleviate this problem, these amplifying circuits are undesirably complex and expensive so that a satisfactory solution to the problem cannot be achieved in this way.

Figure 1:
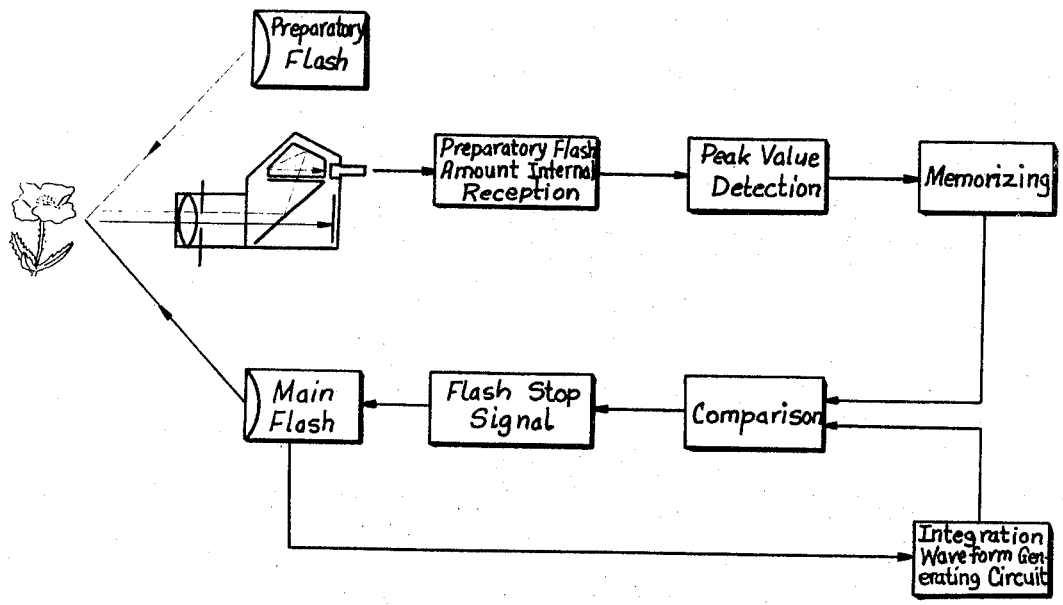
FIG. 1 is a schematic block diagram illustrating the principle of operation of the present invention.

Referring now to FIG. 1, it will be seen that at the top of FIG. 1 there is a designation of a source of preparatory flash illumination which directs light, as indicated by the dotted line toward the object to be photographed, and this light is reflected from the object into the schematically illustrated objective of the camera. The schematically illustrated camera is a single-lens reflex camera in which the light travels along the optical axis to the film during exposure. However, prior to exposure the light is reflected by the swingable mirror upwardly to the viewfinder prism, and part of this light is received by a photosensitive means as schematically designated by the block just to the right of the camera in FIG. 1 where the internal reception of the preparatory flash illumination is indicated. As indicated by the blocks situated to the right of the block indicating internal reception of the preparatory flash illumination, there is first created a detection of a peak value such as peak voltage, resulting from the internal detection of the preparatory flash illumination, and this peak value is then memorized as indicated by the block at the upper right of FIG. 1. This memorized peak value has certain proportional relationships with respect to such photographing conditions as the setting of the diaphragm and the distance between the camera and the object to be photographed.

Once these operations in connection with the preparatory flash illumination have been carried out, the main flash illumination is performed, and light is directed to the object to be photographed as a result of the main flash illumination in the manner indicated schematically with the solid line in FIG. 1, this light from the main flash of course travelling along the optical axis to expose the film as indicated by the solid arrow in the camera shown schematically in FIG. 1. Of course during exposure the schematically illustrated mirror is swung up. The illumination provided during the main flash operation is detected and the main flash illumination is terminated in such a way that the amount of main flash illumination will have a certain proportional relationship with respect to the memorized value obtained during the preparatory flash illumination. However, it is also possible without detecting the illumination during the period of the main flash, to generate an integration wave form in accordance with the amount of light used during main flash, and in this case it is possible to terminate the illumination provided during the period of main flash illumination by comparing this integration wave with the memorized value. Thus, FIG. 1 illustrates in the block diagram the comparison between the integration wave form which is generated during main flash illumination and the peak value which is memorized. As a result of this comparison it is possible to control the amount of light provided by the main flash so that a predetermined amount of light is provided. By controlling the amount of light during main flash in accordance with a factor such as the speed of the film which is exposed, the amount of main flash illumination will correspond to the amount of light required for proper exposure. Thus, in accordance with the comparison indicated in FIG. 1 a flash stop signal will be provided, as indicated in FIG. 1, so that a flash-terminating means will terminate the operation of the main flash.

It is to be noted that with the present invention the manner in which the preparatory flash illumination and main flash illumination are provided is immaterial. For example, it is possible to provide a pair of separate sources for the preparatory flash and main flash, as schematically indicated in FIG. 1. However it is also possible, as described below in connection with FIG. 2, to utilize a single source of flash illumination which is operated first to provide the preparatory flash and then to provide the main flash. In addition it is also possible to operate a single source of flash illumination in which a way that a single continuous flash is provided with the initial part of this single continuous flash being used for the preparatory flash illumination while an immediately following part of the single continuous flash, which occurs without interruption upon termination of the preparatory flash, is used as the main flash illumination.

Mathematically, when carrying out the main flash illumination, the proper amount of exposure light Alux. sec. is:

$$A = \int_0^\infty L(t)dt$$

where $L(t)$ is the whole pencil of light rays of the flash illumination. If the preparatory flash peak voltage is $V_p$, then with an arbitrary amount of light the preparatory flash peak voltage $\alpha\, V_p$ is measured. This latter measured value is compared with the main flash integration value, and the main flash is so controlled that the period or duration of the main flash satisfies the following relationship:

$$\frac{A}{\alpha} = \int_0^t L(t)dt$$

Figure 2:
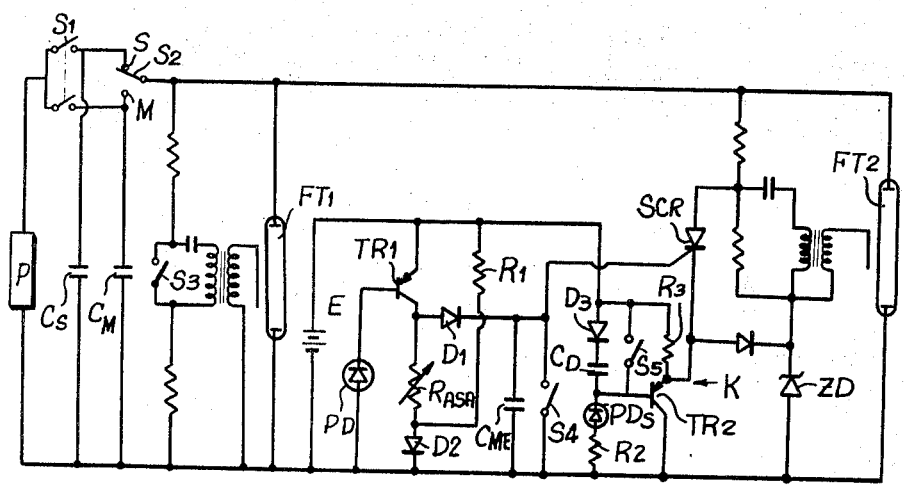
FIG. 2 is a wiring diagram of one possible circuit which may be used in accordance with the invention.

Referring now to the circuit diagram shown in FIG. 2, where one example of an embodiment of the invention is illustrated, the features of the present invention will become apparent. Thus, there is shown at the left of FIG. 2 a current source P which is a direct current source of high voltage. There is also a source E of a direct current of low voltage, this latter source E being provided for the circuit which detects the amount of flash illumination. The circuitry includes a capacitor $C_S$ for the preparatory flash, a capacitor $C_M$ for the main flash, and a single flash tube FT1, which forms a source of both preparatory flash illumination and main flash illumination. In addition there is a flash stop tube FT2, which is employed after the main flash illumination has started so as to form a flash-terminating means, this second tube FT2 serving to terminate the main flash illumination by a known quenching procedure according to which the energy which would otherwise continue to create the main flash with the tube FT1 is instead by-passed through the flash stop tube FT2.

A photosensitive means is provided internally of the camera to receive light after the light has travelled through the objective of the camera during the preparatory flash illumination, and this photosensitive means is illustrated in FIG. 2 in the form of a photodiode PD which thus detects the amount of preparatory flash illumination. This photodiode PD is positioned in the camera at a location where it will receive light reflected from the object to be photographed after the light has travelled through the objective, as pointed out above.

The circuitry of FIG. 2 further includes a switch S1 for disconnecting the current source P, a changeover switch S2 for changing over between the preparatory capacitor $C_S$ and the main capacitor $C_M$, a peak voltage reset switch S4, and an integration wave form generating reset switch S5.

The above system operates as follows:

Initially the switch S1 is closed and charges are accumulated at the capacitors $C_S$ and $C_M$. Through an external action prior to flash operation the switch S1 is opened. At this time the switch S2 engages the contact S, so that the preparatory flash capacitor $C_S$ is now in the circuit, while the main capacitor $C_M$ is not yet operative. Then the switch S3 is closed to ignite flash tube FT1 in order to create the preparatory flash illumination prior to swinging up of the mirror, and at this time the initially closed switch S4 is opened, so that the latter switch opens simultaneously with closing of the switch S3 in order to create the preparatory flash illumination. Then, in the illustrated example, the switch S2 is displaced to the M contact, and the switch S3 is opened, so that the preparatory flash illumination has terminated and the system is ready to carry out the main flash illumination. Then, upon closing of the synchronous X-contact of the camera, simultaneously with opening of the shutter as is well known, the switch S3 is closed to trigger the flash FT1 in order to create the main flash illumination, and simultaneously the switch S5 is opened and the main flash illumination is carried out. All of the above operations of the several switches take place in a sequence controlled, for example, by suitable motion-transmitting elements connected between a shutter-operating plunger of the camera and the various switches in such a way that the switches will be operated in the above sequence and in the above manner as the operator continues to depress the shutter-operating plunger until the shutter trips in order to assume its open position with the simultaneous closing of the switch S3 and opening of the switch S5 as pointed out above.

The photosensitive means PD is connected with a control circuit means described in greater detail below in order to participate therewith in the creation of an electrical quantity which achieves a peak value during the period of preparatory flash illumination, and this control circuit means is electrically connected with a memory means formed by the memory capacitor $C_{ME}$ which serves to retain the peak value achieved during preparatory flash illumination. Between the memory means $C_{Me}$ and the flash-terminating means FT2 is connected a control circuit means which includes an integration capacitor $C_D$ and a second photosensitive means in the form of a photodiode $PD_S$ which is positioned behind the flash tube FT1 so as to directly receive illumination therefrom, this photodiode $PD_S$ being connected in series with the integration capacitor $C_D$ of the control circuit means. The preparatory circuit means includes a transistor TR1 electrically connected with the photosensitive means PD for amplifying the photocurrent thereof, and the control circuit means includes a buffer transistor TR2 for obtaining the light amount integration voltage. This control circuit means includes a silicon control element SCR which has a control electrode for comparing the peak value memory voltage retained by the memory means $C_{ME}$ and the integration wave form achieved by way of the buffer TR2, so that the silicon control rectifier SCR corresponds to the comparison block of FIG. 1. In accordance with the comparison operation which is carried out in a manner described in greater detail below, the flash-terminating means formed by the flash stop tube FT2 is triggered. The control circuit means also includes a diode D1 for preventing the current from flowing in an undesired inverse direction from the peak value memory means $C_{Me}$, and this circuit means further includes a diode D2 for compensating the gate trigger voltage of the SCR which performs the comparison as referred to above. The control circuit means further includes a diode D3 for compensating the base-emitter voltage of the transistor TR2. The preparatory circuit means includes the variable resistor $R_{ASA}$ which is adjusted in accordance with film speed. In the control circuit means there is a resistor R2 for protecting the second photosensitive means $PD_S$, and this circuit further includes a load resistor R3 for the transistor TR2.

When the switch S3 is initially closed and the preparatory flash illumination takes place, the internal photosensitive means PD receives light which has already travelled through the objective and as a result a photocurrent $i_B$ flows through the base of transistor TR1 of the preparatory circuit means. Through the collector of transistor TR1 there flows a current $i_C \times h_{FE} \times i_B$ ($h_{FE}$ is the direct current amplification factor of TR1), so that at the collector of transistor TR1 there is a voltage:

$$V_C = i_C \times R_{ASA} + V_{D2} = h_{FE} + R_{ASA} \times i_B + V_{D2}$$

where $V_{D2}$ is the voltage across the diode D2. When this latter voltage is smaller than $i_{Bmax}$ (the maximum value of the photocurrent), the capacitor $C_{ME}$ is equivalent to the voltage $V_C$. After $i_{Bmax}$ is achieved, the collector voltage of transistor TR1 decreases as a result of the decrease in the photocurrent, while as a result of the operation of the diode D1 the voltage across the memory capacitor $C_{ME}$ does not decrease below the peak voltage value corresponding to the maximum photocurrent value. As a result, memory means formed by capacitor $C_{ME}$ retains the peak memory voltage value $V_{CM} = h_{FE} \times R_{ASA} \times i_{Bmax} + V_{D2}$ until the main flash illumination is carried out. This peak voltage value is proportional to the film speed and the maximum value of the photocurrent.

When the switch S2 is changed over to the contact M and the main flash trigger switch S3 is closed for the second time to create the main flash illumination, as a result of the simultaneous opening of the switch S5 the amount of main flash illumination is received by the second photosensitive means $PD_S$ and is integrated by the capacitor $C_D$. The resulting integrated voltage is applied to the cathode of the SCR. This voltage decreases with time until it is below the value obtained by subtracting the gate trigger voltage of the control element SCR from the peak value memory voltage value retained by the memory means, and then the control element SCR will be triggered and the flash stop tube FT2 will respond to terminate the operation of the main flash by ignition of the flash stop tube FT2. In other words the residual charge in capacitor $C_M$ which otherwise would continue to operate the flash tube FT1 will now discharge through the flash-terminating means FT2.

Figure 3A:
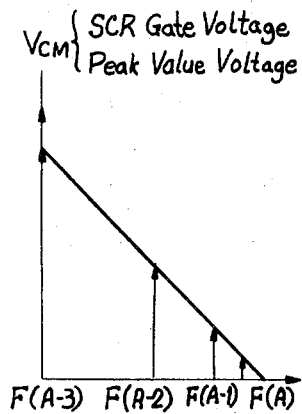
FIGS. 3a–3c are graphs showing curves which illustrate the operation of the structure of the invention.
Figure 3B:
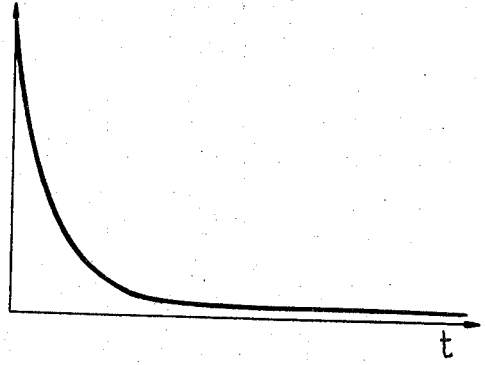
Figure 3C:
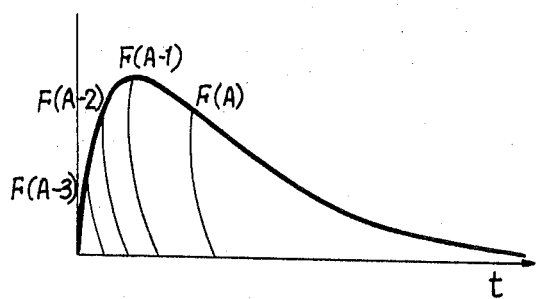

The above operations are illustrated by the graphs of FIGS. 3a–3c. FIG. 3a is a graph having along its abscissa the diaphragm stop values according to which the diaphragm setting F (A) is one step stopped down from F (A−1), and so on for the remaining diaphragm settings illustrated along the abscissa. The ordinate of FIG. 3a represents the peak value memory voltage $V_{CM}$ which acts as the gate voltage for the SCR. FIG. 3b illustrates the integration wave form for the amount of light which is applied to the cathode of the SCR. Thus, the abscissa of FIG. 3b indicates time while the ordinate $V_K$ indicates the integration voltage applied to the cathode of the SCR.

FIG. 3c is a graph illustrating how when the voltages of FIGS. 3a and 3b become equal to each other the main flash illumination is terminated. Thus, the ordinate of FIG. 3c represents the comparison of the voltages of FIGS. 3a and 3b by the SCR while the abscissa of FIG. 3c indicates time.

Mathematically, the voltage $V_K$ of FIG. 3b applied to the cathode of the SCR is:

$$V_K = E - K \int_0^t L(t)dt \qquad (1)$$

where $L(t)$ is the pencil of light rays and $K$ is a constant of the proportion. The gate voltage $V_G$ of the SCR is:

$$V_G = V_{CM} = h_{FE} \times R_{ASA} \times i_{Bmax} + V_{D2} \qquad (2)$$

and the SCR becomes conductive when the following relation is satisfied:

$$V_K + V_{gt} \leq V_{CM} \qquad (3)$$

where $V_{gt}$ is the gate trigger voltage. Applying the above relations (1) and (2) to relation (3):

$$E - K \int_0^t L(t)dt + V_{gt} \leq h_{FE} \times R_{ASA} \times i_{Bmax} + V_{D2}$$

If R1 is so adjusted that $V_{D2} = V_{gt}$, then:

$$E - K \int_0^t L(t)dt \leq h_{FE} \times R_{ASA} \times i_{Bmax}$$

$$\therefore \int_0^t L(t)dt \geq \frac{1}{K}(E - h_{FE} \times R_{ASA} \times i_{Bmax})$$

Thus, it is possible to achieve an amount of light from the main flash which is proportional to the film speed ASA and the peak value photocurrent.

Figure 4:
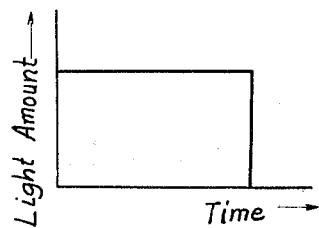
FIGS. 4a, 4b, and 4c are respectively a graph showing one type of light, a circuit used in connection with the light of FIG. 4a, and an integration voltage graph resulting from the features of FIGS. 4a and 4b.
FIGS. 4d, 4e, and 4f are respectively a graph showing another type of light, a circuit used with this latter type of light, and an integration voltage curve resulting from the features of FIGS. 4d and 4e.
Figure 4:
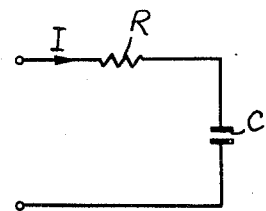
Figure 4:
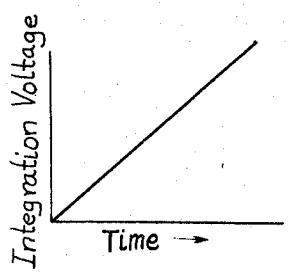
Figure 4:
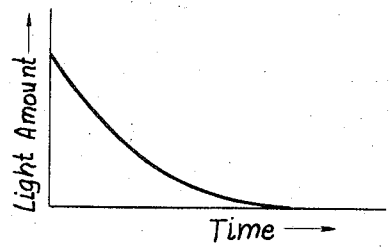
Figure 4:
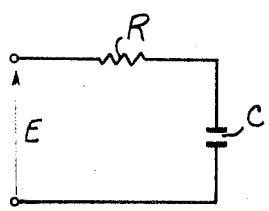
Figure 4:
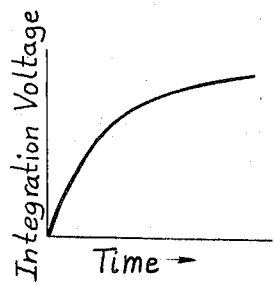

Although in the embodiment described above there is a second photosensitive means $PD_S$, such a second photosensitive means is not essential and it is possible to provide the advantages of the invention while utilizing for the control circuit means which operates during the main flash illumination a structure which does not detect the light created during main flash illumination. Such embodiments of the invention are illustrated in FIGS. 4a–4f and 6A and 6B. Thus, FIGS. 4a and 4d illustrate different flash wave forms according to which the amount of light provided by flash illumination in FIG. 4a is constant while the amount of light provided with the flash illumination in FIG. 4d drops off with time. FIGS. 4b and 4e respectively illustrate electrical circuits for achieving flash amount integration wave forms when light is provided respectively as illustrated in FIGS. 4a and 4d. FIGS. 4c and 4f illustrate the integration wave forms which are achieved with these circuits of FIGS. 4b and 4e, respectively.

In the form of flash illumination during discharge of the flash tube for instantaneous illumination is as illustrated in FIG. 4a, then the integrated value A of the flash illumination is:

$$A = \int_0^t L(t)dt$$

$L(t) = K_o$ (constant),
and therefore: $A = K_o t$. Referring to FIG. 4b the integration voltage is: $V = (I/C) \times t$. If I and C are constant, the integration wave form resulting from the illumination of FIG. 4a can be formed in an equivalent manner by the circuit of FIG. 4b.

If the flash wave form is as illustrated in FIG. 4d, then the integrated value A is:

$$A = \int_0^t L(t)dt$$

$l(t) = K_1 e^{-t/\gamma}$
where $\tau$ is the time constant and $K_1$ is a constant. Then $A = K_1 \tau (1 - e^{-t/\gamma})$. In FIG. 4e the integration voltage V is: $V = E(1 - e^{-t/\gamma})$, so that the integration wave form of FIG. 4d can also be formed in an equivalent manner by the circuit of FIG. 4e.

Also, it is possible from a practical standpoint to achieve the flash wave forms of FIGS. 4a and 4d in an approximate manner.

Figure 6A:
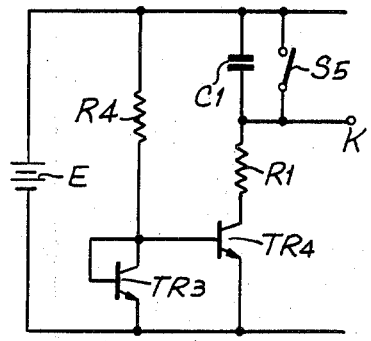
FIG. 6A is a wiring diagram showing another embodiment of part of the circuitry of FIG. 2 which does not require a second photosensitive element.
Figure 6B:
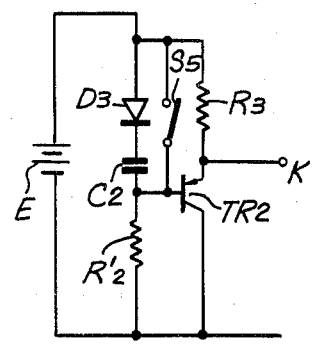
FIG. 6B is a wiring diagram of a further embodiment of part of the circuitry of FIG. 2 which does not require a photosensitive element.

It is apparent, therefore, that it is possible to modify the circuitry of FIG. 2 in order to achieve equivalent integral voltage wave forms without requiring the control circuit means to include a photosensitive means which will detect the main flash illumination. Examples of such modifications are shown in FIGS. 6A and 6B. FIG. 6A illustrates an example of circuitry which may be used to generate an integration wave form which in its light amount has a characteristic equivalent to that of FIG. 4a. The control circuit means of this embodiment includes an integrating capacitor C1 corresponding to the integration capacitor CD, this control circuit means of FIG. 6A being provided to achieve the charging current for the capacitor C1 and including a fixed resistor R4 and a diode connection transistor TR3 which are connected in series with each other. The resulting bleeder voltage of the current source voltage is applied to the base electrode of transistor TR4 which replaces the photosensitive means formed by the photodiode $PD_S$ of FIG. 2. Otherwise the circuitry of FIG. 2 is utilized with the modification of FIG. 6A without further changes. Accordingly, when the switch s5 is opened in synchronism with flash actuation, a current due to the diode connection transistor TR3 flows into the integration capacitor C1 under control of the transistor TR4, producing in this way the integration voltage illustrated in FIG. 4c.

The second modification which is illustrated in FIG. 6B achieves an integration wave form equivalent to the production of flash illumination having a characteristic as illustrated in FIG. 4d. In the example of FIG. 6B the resistor R'2 replaces the photosensitive means formed by the photodiode $PD_S$ of the embodiment of FIG. 2. Otherwise the circuitry of FIG. 2 remains unaltered, and it will be noted that in FIG. 6B the integration capacitor C2 corresponds to the integration capacitor CD of FIG. 2.

Thus, by employing these equivalent integration circuits for the time delay control circuits and without integrating the main flash illumination provided at the time of actual exposure, the previously measured preparatory flash peak value is compared with the integration wave forms of the circuits of FIGS. 6A and 6B in order to achieve the results of the invention. Thus, with this arrangement it is possible to control the duration and thus the light amount of the main flash illumination.

The previously measured preparatory flash peak value is derived under exposure conditions in accordance with the lighting conditions at the object to be photographed, the aperture provided by the select diaphragm setting, and the speed of the film which is exposed. Therefore, the peak value is provided at a level which is the result of the combination of these various exposure factors. Accordingly, the amount of light produced during the main flash illumination can be controlled in such a way that the proper amount of flash illumination is achieved by generating an integration signal which is equivalent to the amount of main flash illumination as this latter amount increases during the duration of the main flash illumination, with this signal being compared with the above-mentioned peak value signal in order to determine in this way the instant when the main flash illumination will be terminated when the trigger signal of the SCR is achieved in accordance with the retained peak value level.

Therefore, with the invention it is possible to carry out control of the flash illumination without utilizing the second photosensitive means formed by the photodiode $PD_S$, so that only a single photosensitive means formed by the photodiode PD is required. With this latter photosensitive means the speed of response to the received light is unimportant because this photosensitive means is utilized only during the preparatory flash operations, and therefore by utilizing only such a single photosensitive means an extremely effective and highly practical arrangement can be achieved to provide the results of the present invention. Of course, while with the embodiment of FIG. 2 a second photosensitive means is used, this second photosensitive means is situated directly in the region of the source of flash illumination to receive light directly therefrom and thus achieve a high-speed response during main flash illumination.

Thus, in accordance with the present invention the light-measurement signal is introduced not in the form of an integration value of the entire amount of light but rather as a limited value corresponding to the peak value of the flash illumination provided during the preparatory flash operations. With this arrangement it is possible to provide a construction which operates as follows: Measurement is made of the light reflected by the object to be photographed during an early initial part of a continuous uninterrupted flash which may be considered as one main flash. After this initial flash duration of the single continuous flash there is an instant which may be considered as determination of the preparatory flash and the commencement of the main flash so that although a single continuous flash is provided it is considered as having an initial duration corresponding to the preparatory flash and a subsequent duration which continues without interruption after the initial duration and which is considered as the main flash illumination. The value of the reflected light at the instant which may be considered as determination of the preparatory flash (the peak value of the brightness or amount of light up to this instant) is utilized in a manner which is equivalent to the embodiments set forth above.

Thus, with such an arrangement it actually is not necessary to carry out distinct preparatory flash operations to measure the light. The early part or stage of the main flash can be used as the source of information for light measurement, and the flash amount can be controlled as set forth above during the intermediate or final part of the flash duration by terminating the flash on the basis of the information derived during the initial part thereof.

As pointed out above, with the present invention the preparatory flash peak value is detected and the control of the main flash is carried out accordingly. Thus, it is not necessary to have a strict correlation between the flash wave forms of the preparatory flash illumination and the main flash illumination. Also, the unavoidable time delay in the response of the light-receiving element during the preparatory flash stage, which is an especially significant factor with internal light measurement, can simply be ignored with the arrangement of the present invention, and thus it becomes possible to simplify the entire circuit structure. The possibility of obtaining the main flash integration wave form by means of an equivalent electrical circuit without even detecting the illumination during the main flash operation permits a proper exposure to be achieved by detecting only the relative peak value during the preparatory flash illumination. Therefore it is clear that with the present invention it is possible to achieve a number of practical advantages.

What is claimed is:

1. In a camera which has an objective, flash means for creating first preparatory flash illumination prior to film exposure and then main flash illumination during film exposure, photosensitive means for receiving light during the preparatory flash illumination after the light has travelled through the objective, preparatory circuit means electrically connected with said photosensitive means and cooperating with said photosensitive means for participating therewith in the creation of an electrical quantity representing the peak value of the preparatory flash illumination during the period of preparatory flash illumination, memory means electrically connected with said preparatory circuit means for retaining said peak value, flash-terminating means electrically connected with said flash means for terminating the operation thereof after said flash means has started the main flash illumination, and control circuit means electrically connected between said memory means and said flash-terminating means for forming a main flash signal representing the intensity of the main flash illumination, for comparing said main flash signal with said peak value and for activating said flash-terminating means to terminate the operation of said flash means when said main flash signal has a given relationship with respect to said peak value.

2. The combination of claim 1 and wherein said flash means provides a single, continuous flash illumination an initial part of which forms the preparatory flash illumination and a subsequent part of which, which follows said initial part without interruption, forms the main flash illumination.

3. The combination of claim 1 and wherein said flash means includes a single source of flash illumination for providing the preparatory flash illumination and the main flash illumination.

4. The combination of claim 1 and wherein a second photosensitive means forms part of said control circuit means and is situated in the region of said flash means for receiving light directly therefrom.

5. The combination of claim 1 and wherein said control circuit means determines the instant of actuation of said flash-terminating means by generating a signal equivalent to the light from said flash means.

6. The combination of claim 5 and wherein said control circuit means includes an integration capacitor.

7. The combination of claim 6 wherein said control circuit means further includes a pair of transistors connected to each other and to said integration capacitor with one of said transistors having a diode connection and the other controlling the flow of current to said integration capacitor.

8. The combination of claim 6 and wherein said control circuit means further includes a resistor connected in series with said integration capacitor.

9. The combination of claim 4 and wherein said control circuit means includes an integration capacitor connected in series with said second photosensitive means.

10. The combination of claim 1 and wherein said control circuit means includes a silicon controlled rectifier having an anode, a cathode, and a gate, and having a gate trigger voltage, said anode being connected to said flash-terminating means, said peak value being coupled to said cathode, and said main flash signal being coupled to said cathode, said SCR becoming conductive when the combination of said main flash signal and said gate trigger voltage becomes equal to or less than said peak value.

* * * * *